United States Patent
Chesnutt et al.

(10) Patent No.: US 7,865,713 B2
(45) Date of Patent: Jan. 4, 2011

(54) APPLICATION-AWARE WIRELESS NETWORK SYSTEM AND METHOD

(75) Inventors: Stan Chesnutt, Berkeley, CA (US); Jamsheed Bugwadia, San Jose, CA (US); Yun Freund, Cupertino, CA (US); Roy Gignac, San Jose, CA (US); Matthew Stuart Gast, San Francisco, CA (US); Dan Simone, Pleasanton, CA (US); Gary Eugene Morain, San Jose, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 569 days.

(21) Appl. No.: 11/966,912

(22) Filed: Dec. 28, 2007

(65) Prior Publication Data

US 2008/0162921 A1  Jul. 3, 2008

Related U.S. Application Data

(60) Provisional application No. 60/877,907, filed on Dec. 28, 2006.

(51) Int. Cl.
*G06F 9/00* (2006.01)
*G06F 9/24* (2006.01)
*G06F 15/177* (2006.01)

(52) U.S. Cl. .................. 713/2; 713/1; 709/220; 709/222

(58) Field of Classification Search .............. 713/1, 713/2; 709/220, 222
See application file for complete search history.

(56) References Cited

U.S. PATENT DOCUMENTS

| | | | |
|---|---|---|---|
| 3,641,433 | A | 2/1972 | Mifflin et al. |
| 4,168,400 | A | 9/1979 | De Couasnon et al. |
| 4,176,316 | A | 11/1979 | DeRosa et al. |
| 4,247,908 | A | 1/1981 | Lockhart et al. |
| 4,291,401 | A | 9/1981 | Bachmann |
| 4,291,409 | A | 9/1981 | Weinberg et al. |
| 4,409,470 | A | 10/1983 | Shepard et al. |
| 4,460,120 | A | 7/1984 | Shepard et al. |
| 4,475,208 | A | 10/1984 | Ricketts |

(Continued)

FOREIGN PATENT DOCUMENTS

GB  2429080 A  *  2/2007

(Continued)

OTHER PUBLICATIONS

Co-pending U.S. Appl. No. 10/778,901, filed Feb. 13, 2004.

(Continued)

*Primary Examiner*—Mark Connolly
(74) *Attorney, Agent, or Firm*—Perkins Coie LLP

(57) ABSTRACT

A technique for dynamically responding to threats in a wireless network involves deploying a single network including APs capable of booting from a plurality of software images. Individual APs can switch (or be switched) between multiple sets of software so that network managers can select the AP software most appropriate for a given instance. For example, if a threat is detected, multiple APs can be switched to sensor mode to deal with the threat. As another example, all of the APs can be switched to sensor mode after hours. Alternatively, a server can provide the software image(s) needed for an AP to operate in accordance with a desired functionality.

20 Claims, 8 Drawing Sheets

U.S. PATENT DOCUMENTS

| | | |
|---|---|---|
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | McRae et al. |
| 4,894,842 A | 1/1990 | Broekhoven et al. |
| 4,901,307 A | 2/1990 | Gilhousen et al. |
| 4,933,952 A | 6/1990 | Albrieux et al. |
| 4,933,953 A | 6/1990 | Yagi |
| 4,995,053 A | 2/1991 | Simpson et al. |
| 5,008,899 A | 4/1991 | Yamamoto |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,142,550 A | 8/1992 | Tymes |
| 5,151,919 A | 9/1992 | Dent |
| 5,157,687 A | 10/1992 | Tymes |
| 5,187,575 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,329,531 A | 7/1994 | Diepstraten |
| 5,339,316 A | 8/1994 | Diepstraten |
| 5,371,783 A | 12/1994 | Rose et al. |
| 5,418,812 A | 5/1995 | Reyes et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,561,841 A | 10/1996 | Markus |
| 5,568,513 A | 10/1996 | Croft et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,960 A | 10/1998 | Tang et al. |
| 5,838,907 A | 11/1998 | Hansen |
| 5,844,900 A | 12/1998 | Hong et al. |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,915,214 A | 6/1999 | Reece et al. |
| 5,920,821 A | 7/1999 | Seazholtz et al. |
| 5,933,607 A | 8/1999 | Tate et al. |
| 5,949,988 A | 9/1999 | Feisullin et al. |
| 5,953,669 A | 9/1999 | Stratis et al. |
| 5,960,335 A | 9/1999 | Umemoto et al. |
| 5,982,779 A | 11/1999 | Krishnakumar et al. |
| 5,987,062 A | 11/1999 | Engwer et al. |
| 5,987,328 A | 11/1999 | Ephremides et al. |
| 5,991,817 A * | 11/1999 | Rowett et al. ............... 709/250 |
| 6,005,853 A | 12/1999 | Wang et al. |
| 6,011,784 A | 1/2000 | Brown |
| 6,041,240 A | 3/2000 | McCarthy et al. |
| 6,078,568 A | 6/2000 | Wright |
| 6,088,591 A | 7/2000 | Trompower |
| 6,101,539 A | 8/2000 | Kennelly et al. |
| 6,118,771 A | 9/2000 | Tajika et al. |
| 6,119,009 A | 9/2000 | Baranger et al. |
| 6,160,804 A | 12/2000 | Ahmed et al. |
| 6,188,649 B1 | 2/2001 | Fine et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,256,300 B1 | 7/2001 | Ahmed et al. |
| 6,256,334 B1 | 7/2001 | Adachi |
| 6,262,988 B1 | 7/2001 | Vig |
| 6,285,662 B1 | 9/2001 | Watanabe |
| 6,304,596 B1 | 10/2001 | Yamano et al. |
| 6,317,599 B1 | 11/2001 | Rappaport et al. |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,404,772 B1 | 6/2002 | Beach et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,580,700 B1 | 6/2003 | Pinard et al. |
| 6,587,680 B1 | 7/2003 | Ala-Laurila et al. |
| 6,614,787 B1 | 9/2003 | Jain et al. |
| 6,624,762 B1 | 9/2003 | End, III |
| 6,625,454 B1 | 9/2003 | Rappaport et al. |
| 6,661,787 B1 | 9/2003 | Jain et al. |
| 6,631,267 B1 | 10/2003 | Thomson et al. |
| 6,659,947 B1 | 12/2003 | Rappaport et al. |
| 6,687,498 B2 | 2/2004 | McKenna et al. |
| 6,697,415 B1 | 2/2004 | Mahany |
| 6,725,260 B1 | 4/2004 | Philyaw |
| 6,760,324 B1 | 7/2004 | Scott et al. |
| 6,747,961 B1 | 10/2004 | Ahmed et al. |
| 6,839,338 B1 | 1/2005 | Amara et al. |
| 6,839,348 B2 | 1/2005 | Tang et al. |
| 6,879,812 B2 | 4/2005 | Rappaport et al. |
| 6,957,067 B1 | 10/2005 | Iyer et al. |
| 6,973,622 B1 | 12/2005 | Rappaport et al. |
| 6,978,301 B2 | 12/2005 | Tindal |
| 7,020,438 B2 | 3/2006 | Sinivaara et al. |
| 7,020,773 B1 | 3/2006 | Otway et al. |
| 7,024,394 B1 | 4/2006 | Ashour et al. |
| 7,062,566 B2 | 6/2006 | Amara et al. |
| 7,068,999 B2 | 6/2006 | Ballai |
| 7,110,756 B2 | 9/2006 | Diener |
| 7,116,979 B2 | 10/2006 | Backes et al. |
| 7,146,166 B2 | 12/2006 | Backes et al. |
| 7,155,518 B2 | 12/2006 | Forslow |
| 7,221,927 B2 | 5/2007 | Kolar et al. |
| 7,224,970 B2 | 5/2007 | Smith et al. |
| 7,263,366 B2 | 8/2007 | Miyashita |

| | | | | | | |
|---|---|---|---|---|---|---|
| 7,280,495 | B1 | 10/2007 | Zweig et al. | 2005/0276218 A1 | 12/2005 | Ooghe et al. |
| 7,317,914 | B2 | 1/2008 | Adya et al. | 2006/0045050 A1 | 3/2006 | Floros et al. |
| 7,324,468 | B2 | 1/2008 | Fischer | 2006/0104224 A1 | 5/2006 | Singh et al. |
| 7,324,487 | B2 | 1/2008 | Saito | 2006/0128415 A1 | 6/2006 | Horikoshi et al. |
| 7,359,676 | B2 | 4/2008 | Hrastar | 2006/0161983 A1 | 7/2006 | Cothrell et al. |
| 7,370,362 | B2 | 5/2008 | Olson et al. | 2006/0174336 A1 | 8/2006 | Chen |
| 7,376,080 | B1 | 5/2008 | Riddle et al. | 2006/0189311 A1 | 8/2006 | Cromer et al. |
| 7,421,248 | B1 | 9/2008 | Laux et al. | 2006/0200862 A1 | 9/2006 | Olson et al. |
| 7,466,678 | B2 | 12/2008 | Cromer et al. | 2006/0245393 A1 | 11/2006 | Bajic |
| 7,489,648 | B2 | 2/2009 | Griswold | 2006/0248331 A1 | 11/2006 | Harkins |
| 7,509,096 | B2 | 3/2009 | Palm et al. | 2006/0274774 A1 * | 12/2006 | Srinivasan et al. .......... 370/420 |
| 7,529,925 | B2 | 5/2009 | Harkins | 2006/0276192 A1 | 12/2006 | Dutta et al. |
| 7,551,619 | B2 | 6/2009 | Tiwari | 2007/0025265 A1 | 2/2007 | Porras et al. |
| 7,573,859 | B2 | 8/2009 | Taylor | 2007/0064718 A1 | 3/2007 | Ekl et al. |
| 7,577,453 | B2 | 8/2009 | Matta | 2007/0070937 A1 | 3/2007 | Demirhan et al. |
| 7,788,475 | B2 * | 8/2010 | Zimmer et al. ................. 713/1 | 2007/0083924 A1 | 4/2007 | Lu |
| 2001/0024953 | A1 | 9/2001 | Balogh | 2007/0086378 A1 | 4/2007 | Matta et al. |
| 2002/0052205 | A1 | 5/2002 | Belostofsky et al. | 2007/0091889 A1 | 4/2007 | Xiao et al. |
| 2002/0060995 | A1 | 5/2002 | Cervello et al. | 2007/0189222 A1 | 8/2007 | Kolar et al. |
| 2002/0069278 | A1 | 6/2002 | Forslow | 2007/0260720 A1 | 11/2007 | Morain |
| 2002/0095486 | A1 | 7/2002 | Bahl | 2008/0008117 A1 | 1/2008 | Alizadeh-Shabdiz |
| 2002/0101868 | A1 | 8/2002 | Clear et al. | 2008/0013481 A1 | 1/2008 | Simons et al. |
| 2002/0176437 | A1 | 11/2002 | Busch et al. | 2008/0014916 A1 * | 1/2008 | Chen ....................... 455/422.1 |
| 2002/0191572 | A1 | 12/2002 | Weinstein et al. | 2008/0056200 A1 | 3/2008 | Johnson |
| 2003/0014646 | A1 | 1/2003 | Buddhikot et al. | 2008/0056211 A1 | 3/2008 | Kim et al. |
| 2003/0018889 | A1 | 1/2003 | Burnett et al. | 2008/0096575 A1 | 4/2008 | Aragon et al. |
| 2003/0055959 | A1 | 3/2003 | Sato | 2008/0107077 A1 | 5/2008 | Murphy |
| 2003/0107590 | A1 | 6/2003 | Levillain et al. | 2008/0114784 A1 | 5/2008 | Murphy |
| 2003/0134642 | A1 | 7/2003 | Kostic et al. | 2008/0117822 A1 | 5/2008 | Murphy et al. |
| 2003/0135762 | A1 | 7/2003 | Macaulay | 2008/0151844 A1 | 6/2008 | Tiwari |
| 2003/0174706 | A1 | 9/2003 | Shankar et al. | 2009/0031044 A1 | 1/2009 | Barrack et al. |
| 2003/0227934 | A1 | 12/2003 | White et al. | 2009/0198999 A1 | 8/2009 | Harkins |
| 2004/0003285 | A1 | 1/2004 | Whelan et al. | | | |
| 2004/0019857 | A1 | 1/2004 | Teig et al. | | | |
| 2004/0025044 | A1 | 2/2004 | Day | | | |
| 2004/0053632 | A1 | 3/2004 | Nikkelen et al. | | | |
| 2004/0062267 | A1 | 4/2004 | Minami et al. | | | |
| 2004/0064560 | A1 | 4/2004 | Zhang et al. | | | |
| 2004/0068668 | A1 | 4/2004 | Lor et al. | | | |
| 2004/0095914 | A1 | 5/2004 | Katsube et al. | | | |
| 2004/0095932 | A1 | 5/2004 | Astarabadi et al. | | | |
| 2004/0143428 | A1 | 7/2004 | Rappaport et al. | | | |
| 2004/0165545 | A1 | 8/2004 | Cook | | | |
| 2004/0208570 | A1 | 10/2004 | Reader | | | |
| 2004/0047320 | A1 | 11/2004 | Eglin | | | |
| 2004/0120370 | A1 | 11/2004 | Tzamaloukas | | | |
| 2004/0221042 | A1 | 11/2004 | Meier | | | |
| 2004/0230370 | A1 | 11/2004 | Tzamaloukas | | | |
| 2004/0236702 | A1 | 11/2004 | Fink et al. | | | |
| 2004/0255167 | A1 | 12/2004 | Knight | | | |
| 2004/0259555 | A1 | 12/2004 | Rappaport et al. | | | |
| 2005/0030929 | A1 | 2/2005 | Swier et al. | | | |
| 2005/0037818 | A1 | 2/2005 | Seshadri et al. | | | |
| 2005/0054326 | A1 | 3/2005 | Rogers | | | |
| 2005/0058132 | A1 | 3/2005 | Okano et al. | | | |
| 2005/0059406 | A1 | 3/2005 | Thomson et al. | | | |
| 2005/0064873 | A1 | 3/2005 | Karaoguz et al. | | | |
| 2005/0068925 | A1 | 3/2005 | Palm et al. | | | |
| 2005/0073980 | A1 | 4/2005 | Thomson et al. | | | |
| 2005/0097618 | A1 | 5/2005 | Arling et al. | | | |
| 2005/0122977 | A1 | 6/2005 | Lieberman | | | |
| 2005/0128989 | A1 | 6/2005 | Bhagwat et al. | | | |
| 2005/0157730 | A1 | 7/2005 | Grant et al. | | | |
| 2005/0180358 | A1 | 8/2005 | Kolar et al. | | | |
| 2005/0181805 | A1 | 8/2005 | Gallagher | | | |
| 2005/0193103 | A1 | 9/2005 | Drabik | | | |
| 2005/0223111 | A1 | 10/2005 | Bhandaru et al. | | | |
| 2005/0239461 | A1 | 10/2005 | Verma et al. | | | |
| 2005/0240665 | A1 | 10/2005 | Gu et al. | | | |
| 2005/0245269 | A1 | 11/2005 | Demirhan et al. | | | |
| 2005/0259597 | A1 | 11/2005 | Benedetto et al. | | | |
| 2005/0059405 | A1 | 12/2005 | Rappaport et al. | | | |
| 2005/0273442 | A1 | 12/2005 | Bennett | | | |

FOREIGN PATENT DOCUMENTS

| | | |
|---|---|---|
| WO | WO 94/03986 | 2/1994 |
| WO | WO-9403986 | 2/1994 |
| WO | WO 99/11003 | 3/1999 |
| WO | WO-9911003 | 3/1999 |
| WO | WO 03/085544 A1 | 10/2003 |
| WO | WO-03085544 | 10/2003 |
| WO | WO 2004/095192 A2 | 11/2004 |
| WO | WO 2004/095800 A1 | 11/2004 |
| WO | WO-2004095192 | 11/2004 |
| WO | WO-2004095800 | 11/2004 |

OTHER PUBLICATIONS

Co-pending U.S. Appl. No. 11/784,307, filed Apr. 5, 2007.
Co-pending U.S. Appl. No. 11/377,859, filed Mar. 15, 2006.
Co-pending U.S. Appl. No. 12/401,073, filed Mar. 10, 2009.
Co-pending U.S. Appl. No. 11/326,966, filed Jan. 5, 2006.
Co-pending U.S. Appl. No. 12/500,392, filed Jul. 9, 2009.
Co-pending U.S. Appl. No. 11/330,877, filed Jan. 11, 2006.
Co-pending U.S. Appl. No. 11/351,104, filed Feb. 8, 2006.
Co-pending U.S. Appl. No. 11/331,789, filed Jan. 14, 2006.
Co-pending U.S. Appl. No. 11/445,750, filed Jun. 1, 2006.
Co-pending U.S. Appl. No. 12/491,201, filed Jun. 24, 2009.
Co-pending U.S. Appl. No. 12/417,830, filed May 3, 2009.
Co-pending U.S. Appl. No. 11/400,165, filed Apr. 5, 2006.
Co-pending U.S. Appl. No. 11/592,891, filed Nov. 3, 2006.
Co-pending U.S. Appl. No. 12/603,391, filed Oct. 21, 2009.
Co-pending U.S. Appl. No. 11/595,119, filed Nov. 10, 2006.
Co-pending U.S. Appl. No. 11/604,075, filed Nov. 22, 2006.
Co-pending U.S. Appl. No. 11/487,722, filed Jul. 17, 2006.
Co-pending U.S. Appl. No. 11/643,329, filed Dec. 20, 2006.
Co-pending U.S. Appl. No. 11/975,134, filed Oct. 16, 2007.
Co-pending U.S. Appl. No. 12/131,028, filed May 3, 2008.
Co-pending U.S. Appl. No. 12/336,492, filed Dec. 16, 2008.
Co-pending U.S. Appl. No. 12/489,295, filed Jun. 22, 2009.
Notice of Allowance Mailed Feb. 26, 2007 in Co-pending U.S. Appl. No. 10/778,901, filed Feb. 13, 2004.
Non-Final Office Action Mailed Sep. 22, 2009 in Co-pending U.S. Appl. No. 11/784,307, filed Apr. 5, 2007.

Notice of Allowance Mailed Feb. 27, 2009 in Co-pending U.S. Appl. No. 11/377,859, filed Mar. 15, 2006.
Final Office Action Mailed Aug. 27, 2008 in Co-pending U.S. Appl. No. 11/377,859, filed Mar. 15, 2006.
Non-Final Office Action Mailed Jan. 8, 2008 in Co-pending U.S. Appl. No. 11/377,859, filed Mar. 15, 2006.
Notice of Allowance Mailed Jun. 11, 2009 in Co-pending U.S. Appl. No. 11/326,966, filed Jan. 5, 2006.
Non-Final Office Action Mailed Nov. 10, 2008 in Co-pending U.S. Appl. No. 11/326,966, filed Jan. 5, 2006.
Non-Final Office Action Mailed Aug. 6, 2009 in Co-pending U.S. Appl. No. 11/330,877, filed Jan. 11, 2006.
Final Office Action Mailed Mar. 13, 2009 in Co-pending U.S. Appl. No. 11/330,877, filed Jan. 11, 2006.
Non-Final Office Action Mailed Sep. 11, 2008 in Co-pending U.S. Appl. No. 11/330,877, filed Jan. 11, 2006.
Non-Final Office Action Mailed Dec. 2, 2009 in Co-pending U.S. Appl. No. 11/351,104, filed Feb. 8, 2006.
Final Office Action Mailed Jun. 10, 2009 in Co-pending U.S. Appl. No. 11/351,104, filed Feb. 8, 2006.
Non-Final Office Action Mailed Oct. 28, 2008 in Co-pending U.S. Appl. No. 11/351,104, filed Feb. 8, 2006.
Notice of Allowance Mailed Feb. 23, 2010 in Co-pending U.S. Appl. No. 11/331,789, filed Jan. 14, 2006.
Non-Final Office Action Mailed Aug. 5, 2009 in Co-pending U.S. Appl. No. 11/331,789, filed Jan. 14, 2006.
Final Office Action Mailed Oct. 23, 2008 in Co-pending U.S. Appl. No. 11/331,789, filed Jan. 14, 2006.
Non-Final Office Action Mailed Jun. 13, 2008 in Co-pending U.S. Appl. No. 11/331,789, filed Jan. 14, 2006.
Notice of Allowance Mailed Jun. 16, 2009 in Co-pending U.S. Appl. No. 11/445,750, filed Jun. 1, 2006.
Non-Final Office Action Mailed Feb. 17, 2009 in Co-pending U.S. Appl. No. 11/445,750, filed Jun. 1, 2006.
Final Office Action Mailed May 28, 2009 in Co-pending U.S. Appl. No. 11/417,830, filed May 3, 2006.
Non-Final Office Action Mailed Nov. 14, 2008 in Co-pending U.S. Appl. No. 11/417,830, filed May 3, 2006.
Notice of Allowance Mailed Apr. 23, 2009 in Co-pending U.S. Appl. No. 11/400,165, filed Apr. 5, 2006.
Non-Final Mailed Aug. 19, 2008 in Co-pending U.S. Appl. No. 11/400,165, filed Apr. 5, 2006.
Final Office Action Mailed Jul. 20, 2009 in Co-pending U.S. Appl. No. 11/592,891, filed Nov. 3, 2006.
Non-Final Office Action Mailed Jan. 14, 2009 in Co-pending U.S. Appl. No. 11/592,891, filed Nov. 3, 2006.
Final Office Action Mailed Jan. 5, 2010 in Co-pending U.S. Appl. No. 11/595,119, filed Nov. 10, 2006.
Non-Final Office Action Mailed Jul. 21, 2009 in Co-pending U.S. Appl. No. 11/595,119, filed Nov. 10, 2006.
Non-Final Office Action Mailed Aug. 7, 2009 in Co-pending U.S. Appl. No. 11/487,722, filed Jul. 17, 2006.
Notice of Allowance Mailed Mar. 19, 2010 in Co-pending U.S. Appl. No. 11/487,722, filed Jul. 17, 2006.
International Search Report PCT/US05/004702 dated Aug. 10, 2006, pp. 1-3.
Written opinion PCT/US05/004702 dated Aug. 10, 2006, pp. 1-5.
International Search Report PCT/US06/09525 dated Sep. 13, 2007, pp. 1-2.
Written Opinlon PCT/US06/09525 dated Sep. 13, 2007, pp. 1-7.
International Search Report PCT/US06/40498 dated Dec. 28, 2007, pp. 1-2.
Written Opinion PCT/US06/40498 dated Dec. 28, 2007, pp. 1-5.
International Seartsh Report PCT/US07/14847 dated Apr. 1, 2008, pp. 1-4.
Written Opinion PCT/US07/14847 dated Apr. 1, 2008, pp. 1-4.
International Search Report PCT/US07/089134 dated Apr. 10, 2008, pp. 1-3.
Written Opinion PCT/US07/089134 dated Apr. 10, 2008, pp. 1-4.
U.S. Appl. No. 11/326,966, filed Jan. 2006, Taylor.
U.S. Appl. No. 11/330,877, filed Jan. 2006, Matta.
U.S. Appl. No. 11/331,789, filed Jan. 2006, Matta et al.
U.S. Appl. No. 11/351,104, filed Feb. 2006, Tiwari.

U.S. Appl. No. 11/377,859, filed Mar. 2006, Harkins.
U.S. Appl. No. 11/400,165, filed Apr. 2006, Tiwari.
U.S. Appl. No. 11/445,750, filed May 2006, Matta.
U.S. Appl. No. 11/417,830, filed May 2006, Morain.
U.S. Appl. No. 11/417,993, filed May 2006, Jar et al.
U.S. Appl. No. 11/437,537, filed May 2006, Freund et al.
U.S. Appl. No. 11/437,538, filed May 2006, Zeldin.
U.S. Appl. No. 11/437,387, filed May 2006, Zeldin et al.
U.S. Appl. No. 11/437,582, filed May 2006, Bugwadia et al.
U.S. Appl. No. 11/451,704, filed Jun. 2006, Riley.
U.S. Appl. No. 11/487,722, filed Jul. 2006, Simons et al.
U.S. Appl. No. 11/592,891, filed Nov. 2006, Murphy, James.
U.S. Appl. No. 11/595,119, filed Nov. 2006, Murphy, James.
U.S. Appl. No. 11/604,075, filed Nov. 2006, Murphy et al.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast, Mathew S.
U.S. Appl. No. 11/852,234, filed Sep. 2007, Gast et al.
U.S. Appl. No. 11/944,346, filed Nov. 2007, Gast, Mathew S.
U.S. Appl. No. 11/970,484, filed Jan. 2008, Gast, Mathew S.
U.S. Appl. No. 11/975,134, filed Oct. 2007, Aragon et al.
U.S. Appl. No. 12/077,051, filed Mar. 2008, Gast, Mathew S.
Acampora and Winters, IEEE Communications Magazine, 25(8):11-20 (1987).
Acampora and Winters, IEEE Journal on selected Areas in Communications. SAC-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", pp. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, June 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13$^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, April 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.

Skidmore et al., "Interactive Coverage Region and System Design Simulation for Wireless Communication Systems in Multi-floored Indoor Environments, SMT Plus" IEEE ICUPC '96 Proceedings (1996).

Ullmo et al., "Wireless Propagation in Buildings: A Statistic Scattering Approach", IEEE Transactions on Vehicular Technology, vol. 48, No. 3, May 1999.

Puttini, R., Percher, J., Me, L., and de Sousa, R. 2004. A fully distributed IDS for MANET. In *Proceedings of the Ninth international Symposium on Computers and Communications 2004* vol. 2 (*Iscc'04*)—vol. 02 (Jun. 28-Jul. 1, 2004). ISCC. IEEE Computer Society, Washington, DC, 331-338.

Acampa and Winters, IEEE Journal on selected Areas in Communications. SAC-5:796-804 (1987).

Durgin, et al., "Measurements and Models for Radio Path Loss and Penetration Loss in and Around Homes and Trees at 5.85 GHz", IEEE Transactions on Communications, vol. 46, No. 11, Nov. 1998.

Fortune et al., IEEE Computational Science and Engineering, "Wise Design of Indoor Wireless Systems: Practical Computation and Optimization", pp. 58-68 (1995).

Freret et al., Applications of Spread-Spectrum Radio to Wireless Terminal Coummunications, Conf. Record. Nat'l Telecom. Conf., Nov. 30-Dec. 4, 1980.

Geier, Jim. Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.

Ho et al., "Antenna Effects on Indoor Obstructed Wireless Channels and a Deterministic Image-Based Wide-Based Propogation Model for In-Building Personal Communications Systems", International Journal of Wireless Information Networks, vol. 1, No. 1, 1994.

Kim at al., "Radio Propogation Measurements and Prediction Using Three-Dimensional Ray Tracing in Urban Environments at 908 MHz and 1.9 GHz", IEEE Transactions on Vehicular Technology, vol. 48, No. 3, May 1999.

Kleinrock and Scholl, Conference record 1977 ICC vol. 2 of 3, June 12-15 Chicago Illinois "Packet Switching in radio Channels: New Conflict-Free Multiple Access Schemes for a Small Number of data Users", (1977).

LAN/MAN Standards Committee of the IEEE Computer Society, Part 11:Wireless LAN Medium Access Control (MAC) and Physical Layer (PHY) Specifications: Higher Speed Physical Layer Extension in the 2.4 GHz Band, IEEE Std. 801.11b (1999).

Okamoto and Xu, IEEE, Proceedings of the 13th Annual Hawaii International Conference on System Sciences, pp. 54-63 (1997).

Panjawani et al., "Interactive Computation of Coverage Regions for Wireless Communication in Multifloored Indoor Environments", IEEE Journal on Selected Areas in Communications, vol. 14, No. 3, Apr. 1996.

Perram and Martinez, "Technology Developments for Low-Cost Residential Alarm Systems", Proceedings 1977 Carnahan Conference on Crime Countermeasures, April 6-8, pp. 45-50 (1977).

Piazzi et al., "Achievable Accuracy of Site-Specific Path-Loss Predictions in Residential Environments", IEEE Transactions on Vehicular Technology, vol. 48, No. 3, May 1999.

Puttini, R., Percher, J., Me, L., and De Sousa, R. 2004. A fully distributed IDS for MANET. In *Proceedings of the Ninth international Symposium on Computers and Communications 2004* vol. 2 (*Iscc'04*)—vol. 02 (Jun. 28-Jul. 1, 2004). ISCC. IEEE Computer Society. Washington. DC. 331-338.

Seidel et al, "Site-Specific Propagation Prediction for Wireless In-Building Personal Communications System Design", IEEE Transactions on Vehicular Technology, vol. 43, No. 4, Nov. 1994.

Skidmore et al., "Interactive Coverage Region and System Design Simulation for Wireless Communication Systems in Multi-floored Indoor Environments, SMT Plus", IEEE ICUPC '96 Proceedings (1996).

Ullmo et al., "Wireless Propogation in Buildings: A Statistic Scattering Approach", IEEE Transactions on Vehicular Technology, vol. 48, No. 3, May 1999.

\* cited by examiner

APPLICATION-AWARE WIRELESS NETWORK SYSTEM AND METHOD

CROSS-REFERENCE TO RELATED APPLICATIONS

This application claims priority to U.S. Provisional Patent Application No. 60/877,907, filed Dec. 28, 2006, which is hereby incorporated by reference in its entirety.

BACKGROUND

An access point (AP) is a device used by wireless clients to connect to a network. An AP functions as a standalone entity in some implementations and functions in cooperation with distribution hardware in other implementations. Distribution hardware may include a wireless switch used to manage APs and provide network-connectivity to wireless clients. A wireless domain may refer to a group of wireless switches that are configured to exchange relevant information, and using this information make informed decisions. A known device is a station (e.g., a wireless AP or client device) that is part of a network wireless installation. A rogue device is a station that is considered harmful for a network wireless installation because it is, for example, violating policies or hampering wireless access to the network.

A traditional approach to rogue detection has been to (1) use a second set of hardware in addition to APs, or (2) provide an integrated network that provides both data services and rogue detection services. The advantage of the first approach is that a user can select the best devices for the job, though this often results in higher capital and operational expenditures. The second approach saves money by using a single network and point of administration, but the user may have to compromise product feature sets because of the need to use a single vendor.

These are but a subset of the problems and issues associated with wireless access point authentication, and are intended to characterize weaknesses in the prior art by way of example. The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for dynamically responding to threats in a wireless network involves deploying a single network including APs capable of booting from a plurality of software images. Individual APs can switch (or be switched) between multiple sets of software so that network managers can select the AP software most appropriate for a given instance. For example, if a threat is detected, multiple APs can be switched to sensor mode to deal with the threat. As another example, all of the APs can be switched to sensor mode after hours. Alternatively, a server can provide the software image(s) needed for an AP to operate in accordance with a desired functionality.

The proposed system can offer, among other advantages, improved wireless network functionality. This and other advantages of the techniques described herein will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1A:
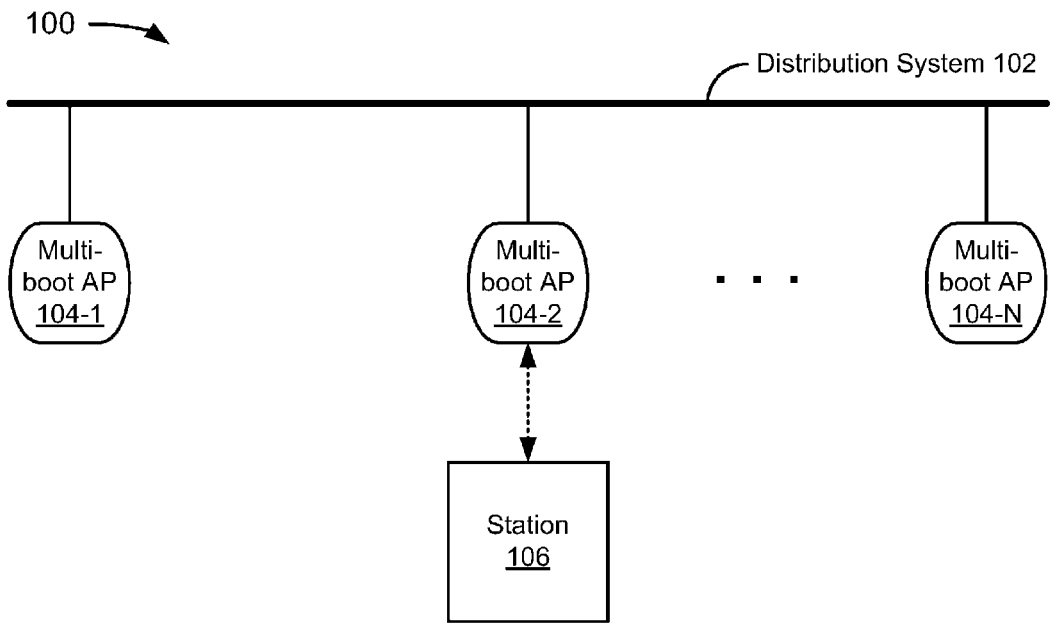
FIGS. 1A and 1B depict an example of a system having a plurality of multi-boot access points (APs).
Figure 1B:
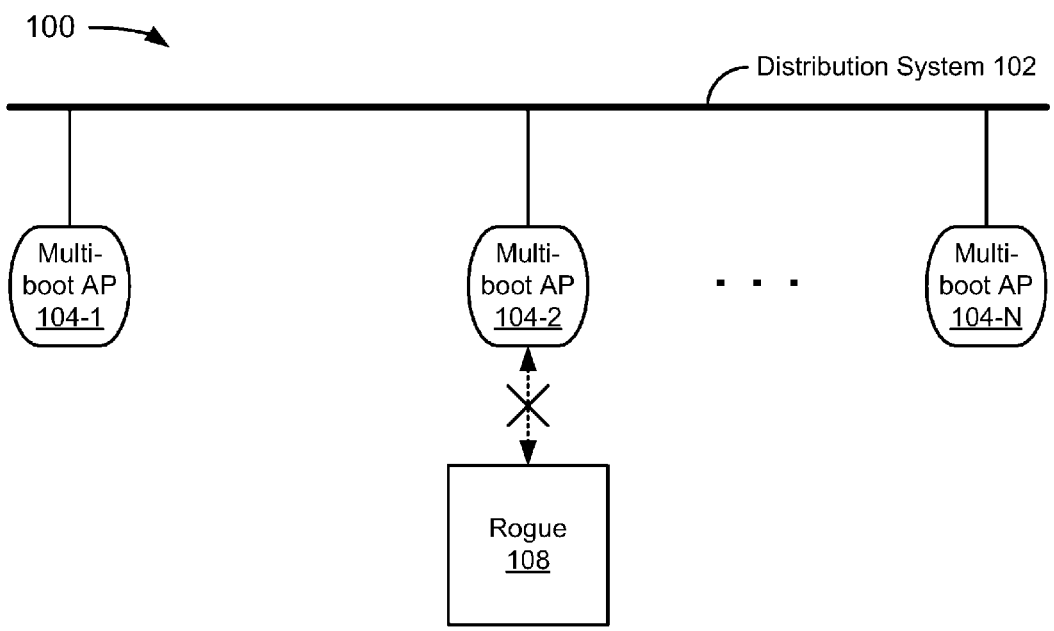

FIGS. 1A and 1B depict an example of a system 100 having a plurality of multi-boot access points (APs). In the example of FIGS. 1A and 1B, the system 100 includes distribution system 102, and a plurality of multi-boot APs 104-1 to 104-N (referred to collectively as multi-boot APs 104). In the example of FIG. 1A, the system 100 includes a station 110 that is associated, for illustrative purposes, with the multi-boot AP 104-2. Presumably, since the station 106 has associated with the multi-boot AP 104-2, the multi-boot AP 104-2 has booted software that enables operation as a traditional AP. However, any of the multi-boot APs 104 can be switched to a different mode by booting different software.

In the example of FIG. 1B, the multi-boot AP 104-2 becomes aware that the station 106 is a rogue 108. When the multi-boot AP 104-2 becomes aware of the rogue 108, the association ends. Although in the example of FIG. 1B the rogue 108 appears to be disassociated from the multi-boot AP 104-2, the rogue 108 could be detected before an actual association with the multi-boot AP 104-2.

The determination that the station 106 is the rogue 108 may be made at the distribution system 102, or by some other one or more of the multi-boot APs 104 that are configured in, for example, a sensor mode. The multi-boot AP 104-2 can be rebooted with different software that gives the multi-boot 104-2, e.g., sensor functionality to help deal with the rogue 108 with, e.g., countermeasures. In an illustrative embodiment, when the multi-boot AP 104-2 is in sensor mode, no association is possible. Some of the advantages of the system 100 are explored later.

Figure 2A:
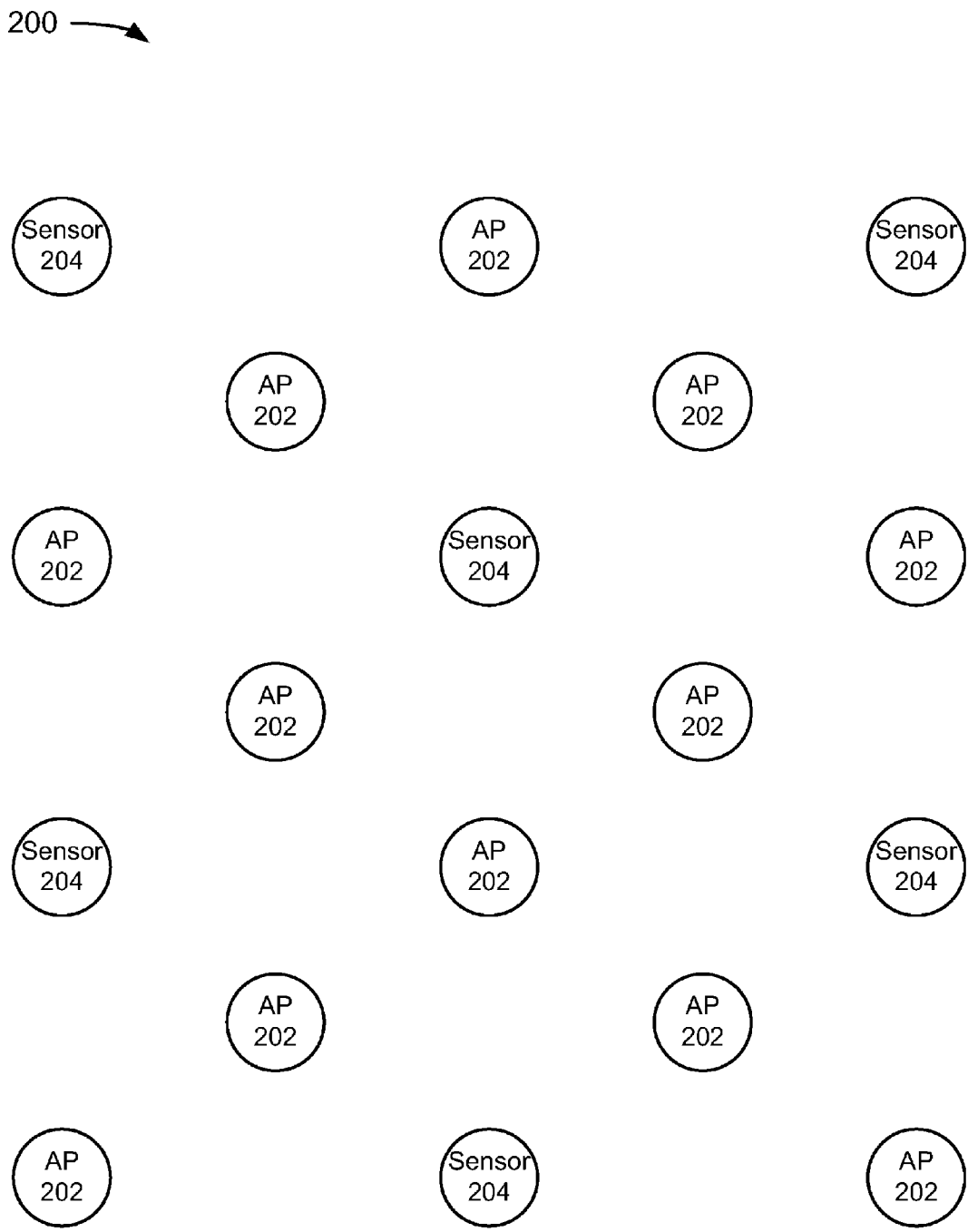
FIGS. 2A, 2B, and 2C depict a wireless domain that includes a plurality of multi-boot APs.
Figure 2B:
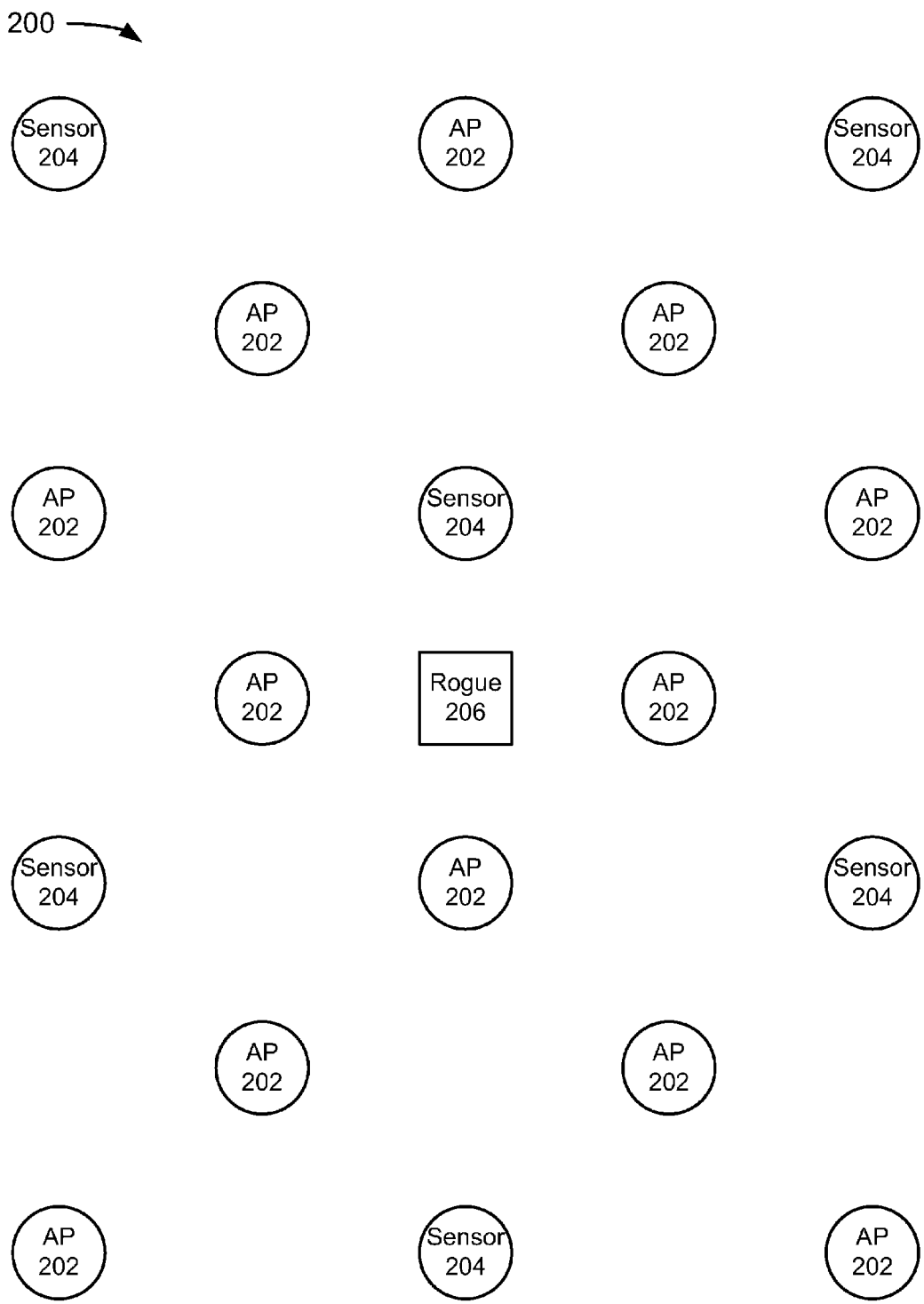
Figure 2C:
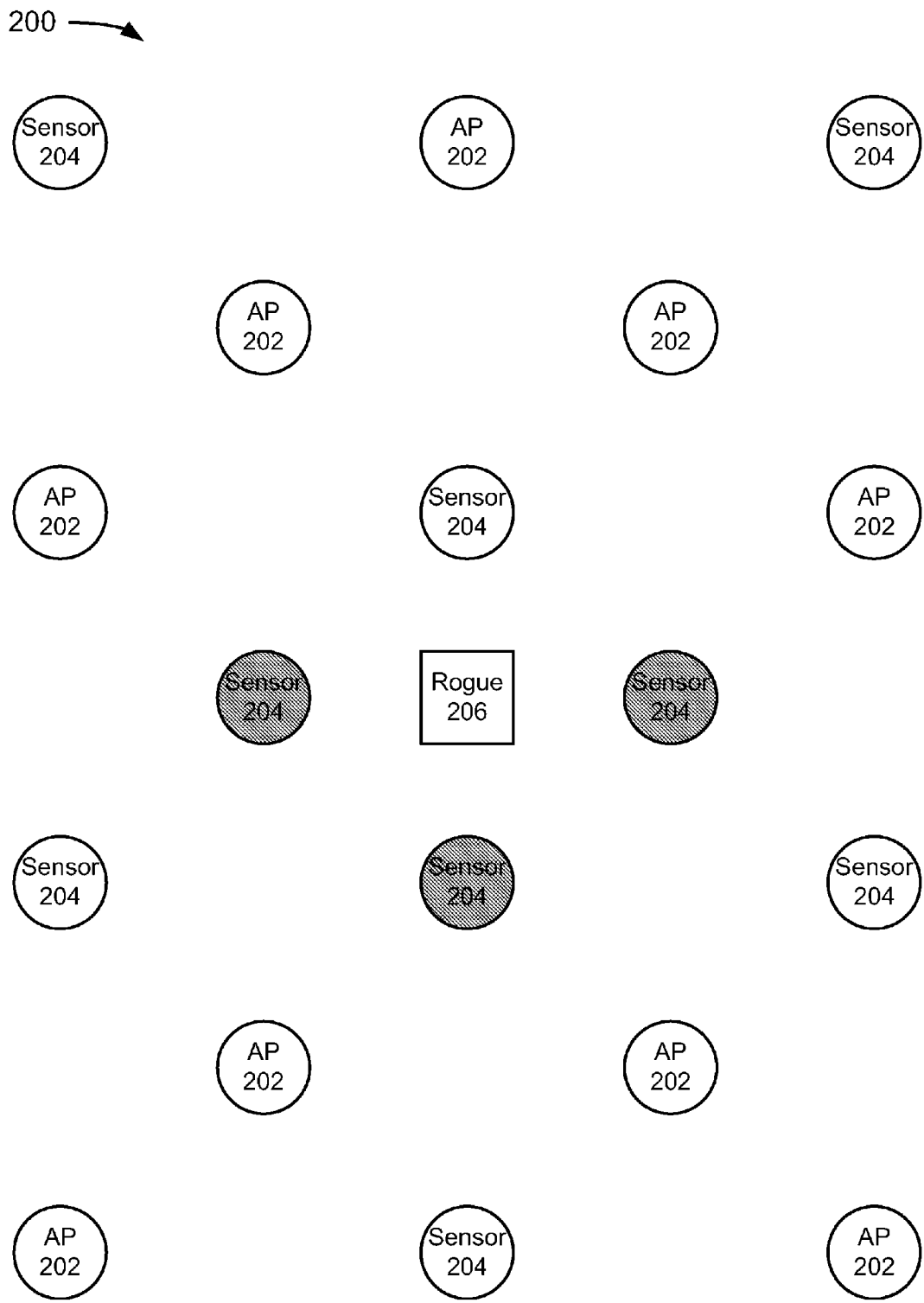

FIGS. 2A, 2B, and 2C depict a wireless domain 200 that includes a plurality of multi-boot APs. The wireless domain 200 may include, by way of example but not limitation, a Trapeze Networks, Inc. MOBILITY DOMAIN™ wireless domain. In the example of FIG. 2A, the wireless domain 200 includes a plurality of multi-boot APs 202 configured in network connectivity mode (APs 202) and a plurality of multi-boot APs 204 configured in sensor mode (sensors 204). The APs 202 and the sensors 204 are organized in an arbitrary or implementation-specific pattern in the mobility domain 200.

In the example of FIG. 2B, a rogue 206 is detected in the wireless domain 200. When the rogue 206 is detected, an alarm may be generated. The alarm can lead to a change in the functionality of the APs 202 and/or sensors 204. One example of a change is illustrated in the example of FIG. 2C.

In the example of FIG. 2C, APs 202 in the vicinity of the rogue 206 are switched to sensors 204. For illustrative purposes, the changed sensors are shaded in the example of FIG. 2C. In an illustrative embodiment, the determination as to which APs to change to sensors may depend upon implementation-specific configurations or capabilities. For example, APs may be changed to sensors when a risk score exceeds a threshold value.

In another illustrative embodiment, the threshold value may be set, and the risk score may increase based upon activities or events associated with a station. In another illustrative embodiment, the number of APs to convert is also either statically or dynamically configurable. For example, the number of APs converted may be based upon the severity of an event that triggers the conversion. In another illustrative embodiment, multiple APs may be converted for other reasons. For example, if at least three APs are in sensor mode, then triangulation may be facilitated. Additional APs may improve the accuracy of a triangulation technique.

In another illustrative embodiment, the amount of investigation predicted to be required may have a bearing on the number of APs converted. In another illustrative embodiment, the system may convert APs depending upon the location of the event that triggers the conversion. In another illustrative embodiment, the location of the APs may have a bearing upon the choice of APs to convert. In another illustrative embodiment, the amount of load on an AP may have a bearing on whether the AP is converted. For example, if an AP that has a lot of stations associated with it is selected for conversion to a sensor, it may be decided that the conversion is not worth the disruption of service to the associated stations, if any.

Figure 3:
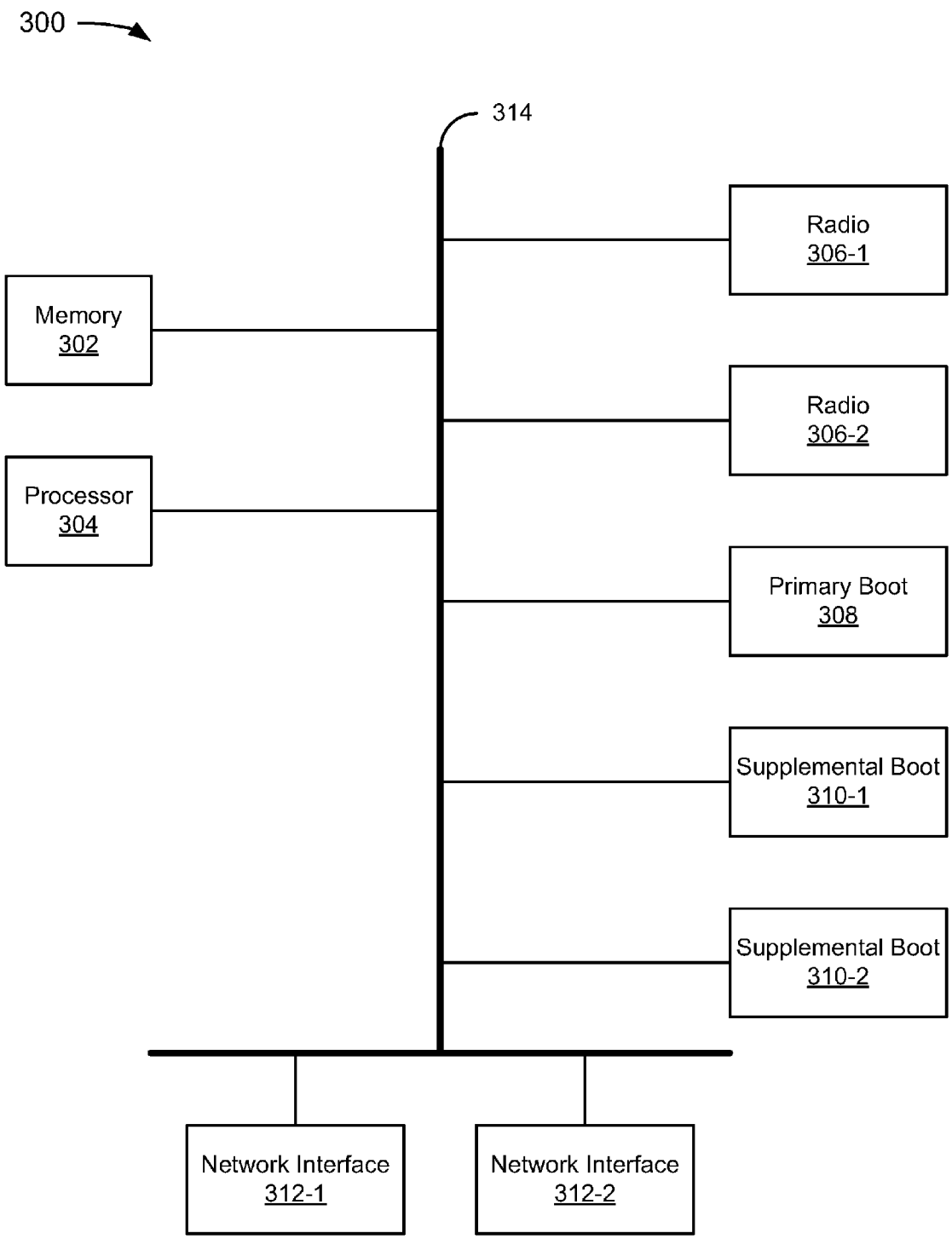
FIG. 3 depicts an example of a multi-boot AP device.

FIG. 3 depicts an example of a multi-boot AP device 300. In the example of FIG. 3, the device 300 includes memory 302, a processor 304, one or more radios 306-1, 306-2 (referred to collectively as radios 306), a primary boot 308, one or more supplemental boots 310-1, 310-2 (referred to collectively as supplemental boots 310), one or more network interfaces 312-1, 312-2 (referred to collectively as network interfaces 312), and a bus 314 to which each of the other components are coupled.

In an illustrative embodiment, the memory 302 may be primary memory such as random access memory (RAM). Any applicable known or convenient memory may be used. In an illustrative embodiment, the processor 304 may be a central processing unit (CPU), a microprocessor, or some other processor capable of executing code stored in the memory 302. Any applicable known or convenient processor may be used. In an illustrative embodiment, the radios 306 may be set to work on the same technology/protocol. The radios may have different configurations, such as different channel operations or modes. The radios 306 may also be set to work on different technology/protocols, such as 802.11a for one and 802.11b/g for another. Any known or convenient radio technology may be used.

In an illustrative embodiment, the primary boot 308 is embodied in a computer-readable medium. The computer-readable medium may include, by way of example but not limitation, flash memory. In an illustrative embodiment, the supplemental boots 310 are embodied in a computer-readable medium, as well. In an illustrative embodiment, the network interfaces 312 may include Ethernet interfaces. However, any applicable known or convenient network interfaces could be used.

In an illustrative embodiment that has two boot partitions, boot0 and boot1, the primary boot 308 is the first boot partition, boot0, and a supplemental boot 310-1 is the second boot partition, boot1. (In this illustrative embodiment, there is only one supplemental boot.) The device 300 will first attempt to boot from the boot1. If that fails, or if the boot1 partition is marked bad, it will fall back to boot0.

In a specific implementation, Trapeze Networks software may be loaded into boot0, and third-party software into boot1. That way, the device 300 will boot under control of third-party software. To switch back, the boot1 partition is marked bad, which causes the device 300 to fall back to Trapeze Networks software. In at least one implementation, the Trapeze Networks software is read-only so that the image is always available, but this is an implementation-specific decision. In this implementation, only one third-party software image is provided in boot1, but it can be swapped out for another image.

Figure 4:
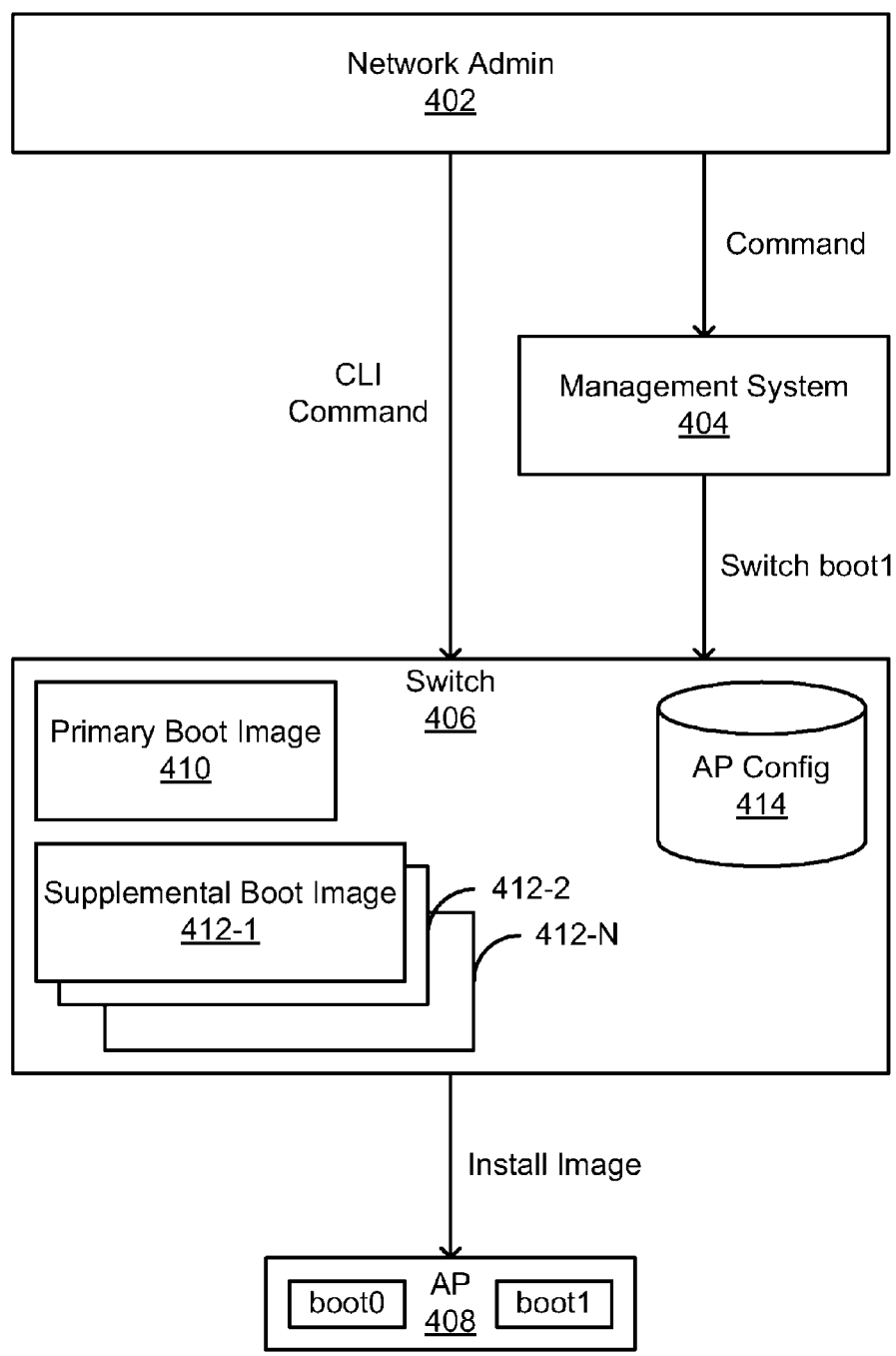
FIG. 4 depicts an example of a system for changing boot1 statically at an AP.

FIG. 4 depicts an example of a system 400 for changing boot1 statically at an AP. As used herein, changing boot1 statically refers to making the change by an administrator. Dynamically changing boot1 on the other hand, which is discussed later with reference to FIG. 5, involves changing boot1 in accordance with detected events, a schedule, or other environmental stimuli.

In the example of FIG. 4, the system 400 includes a network administrator 402, a management system 404, a switch 406, and an AP 408. The network administrator 402 may include a human and/or artificial entity. The management system 404 may be embodied in a computer-readable medium and may include, by way of example but not limitation, a TRAPEZE NETWORKS RINGMASTER™ management system. The switch 406 may include, by way of example but not limitation, a MOBILITY EXCHANGE™ or MX® switch. The AP may include a MOBILITY POINT™ or MP® AP.

In the example of FIG. 4, the switch 406 includes a primary boot image 410, one or more supplemental boot images 412-1 to 412-N (referred to collectively as the supplemental boot images 412), and an AP configuration database 414. The AP 408 includes the primary boot image 410 (boot0) and one of the supplemental boot images 412 (boot1).

In the example of FIG. 4, in operation, the network administrator 402 may trigger changes to boot1 at the AP 408 using the management system 404. The control application 404, upon receiving an appropriate command from the network administrator 402 sends a command to the switch 406 to change boot1, as appropriate. The network administrator 402 may also enter the appropriate command to the switch 406. The network administrator 402 may or may not be able to also change boot0 at the AP 408 using CLI or other commands. However, it may be desirable to provide the capability of allowing installation of the primary boot image at installation or re-installation.

When the command is received at the switch 406, the AP configuration database 414 on the switch 406 is updated to indicate that the AP 408 should use one of the supplemental boot images 412. The switch 406 then provides the appropriate boot image of the supplemental boot images 412 to the AP 408, which the AP 408 stores as boot1.

While the example of FIG. 4 depicts components that may be used for static AP boot image installation, in some embodiments it may be desirable to add dynamic AP boot image installation (or switching between boot images at the AP). Some examples of events leading to dynamic conversion may include by way of example but not limitation:

Automatic conversion of an AP to an IDS sensor based on an alarm.

Automatic conversion of all APs to IDS sensors based on time, so that the entire wireless network stops offering service when the facility closes and instead runs an intrusion detection application. The conversion would be reversed when the facility re-opens so that service is again provided to users.

By automating the conversion in a management system, it may be possible to select the "best" AP for conversion. In the case of a rogue, it will likely be detected by several APs. In an illustrative embodiment, the management system can select an AP based on a policy that includes the strongest signal strength, to pick the "closest" AP, or the least loaded AP, so as to minimize user disruption.

The management system can manage AP conversions so as to ensure that a minimum set of APs are being used to provide service and prevent service from falling below a threshold. Likewise, the management system can manage the AP pool so that a minimum level of third-party functionality is maintained.

The management system can assess threat levels based on, for example, a risk-based score so that there is a minimum threshold score for conversion, and progressively higher scores result in conversion of larger numbers of APs to security services.

The management system can link conversion events to a rollback, so that an AP can be "leased" to a third-party application and reclaimed at the end of a given time duration. It would also be possible for that application to extend its lease.

Figure 5:
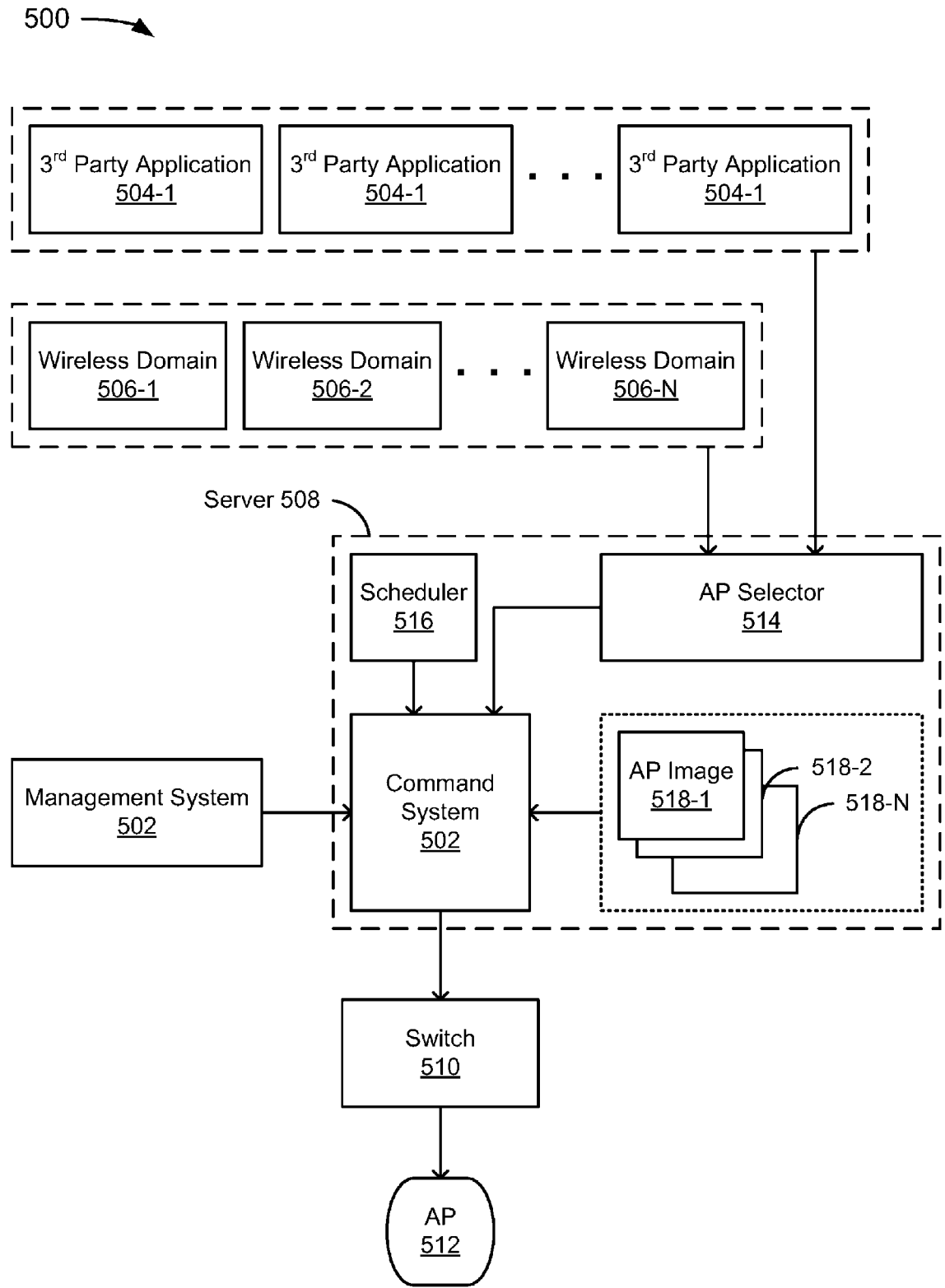
FIG. 5 depicts an example of a system for changing boot1 dynamically at an AP.

FIG. 5 depicts an example of a system 500 for changing boot images dynamically at an AP. The system 500 includes a management system 502, one or more third party applications 504-1 to 504-N (referred to collectively as third party applications 504), one or more wireless domains 506-1 to 506-N (referred to collectively as wireless domains 506), a server 508, a switch 510, and an AP 512.

The third party applications 504 include applications that provide functionality to the server 508 that may be of use in a wireless domain. For example, the third party applications 504 may include security applications. The wireless domains 506 provide RF data to the server 508. It should be noted that the switch 510 may be included in one of the wireless domains 506, and may provide RF data (not shown).

The server 508 may include an AP selector 514, a scheduler 516, AP images 518, and a command system 520. The AP selector 514 can receive requests for conversion from multiple sources and unify them. For example, the AP selector 514 may receive input from the third party applications 504, the wireless domains 506 (e.g., in the form of RF data), or from other applicable sources that serve to improve the accuracy of the AP selector 514 (not shown). The AP selector 514 may include an engine for making probabilistic assessments of risk prior to image selection. The AP selector may initially convert a few APs on the first request from a third-party system, and progressively add more if the situation is not resolved. The AP selector 514, after determining a course of action based upon the risk assessment, provides a command to the command system 520.

The scheduler 516 may include a timer that is set according to implementation-specific parameters. For example, the timer may be associated with a running time between conversion of APs, times when an enterprise is open (e.g., switching to network connectivity mode during work hours), or some other schedule. The scheduler 516 provides a command to the command system 520 based upon the configured schedule(s).

The AP images 518 are available to the command system 520. It may be that the AP images 518 are not needed even when an AP image is to be changed. For example, the AP 512 may include multiple boot images, including the image to which the switch 510 (as instructed by the command system 520) attempts to switch the AP 512. It may be that the AP images 518 are needed because the AP 512 can only hold a single image (requiring a new image with each AP image change), or because the AP 512 does not include the image that is needed based upon the desired functionality.

Using techniques described herein, multiple IDS partners may be used for statistical defense against attacks. APs could also be dedicated on-demand to location functions and "spotlighting" particular client devices.

Figure 6:
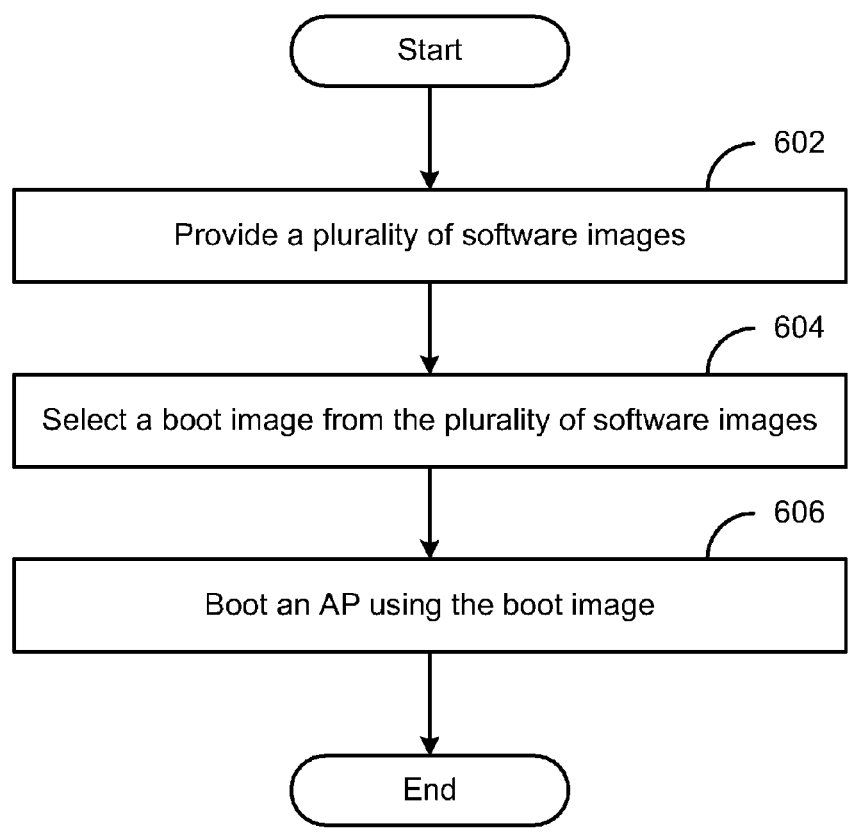
FIG. 6 depicts a flowchart 600 of an example of a method for booting an AP using a boot image.

FIG. 6 depicts a flowchart 600 of an example of a method for booting an AP using a boot image. This method and other methods are depicted as serially arranged modules. However, modules of the methods may be reordered, or arranged for parallel execution as appropriate. In the example of FIG. 6, the flowchart 600 starts at module 602 where a plurality of software images are provided. The software images may be provided at a server or at an AP.

In the example of FIG. 6, the flowchart 600 continues to module 604 where a boot image is selected from the plurality of software images. The boot image may be selected after a determination is made as to the desired functionality for an AP at a given time. The determination may be based upon, for example, risk assessment, according to a schedule, or to sign a spotlight on a particular station.

In the example of FIG. 6, the flowchart 600 continues to module 606 where an AP is booted using the boot image. Then the flowchart 600 ends. Presumably, the AP then operates in accordance with the functionality of the boot image.

As used herein, a wireless network refers to any type of wireless network, including but not limited to a structured network or an ad hoc network. Data on a wireless network is often encrypted. However, data may also be sent in the clear, if desired. With encrypted data, a rogue device will have a difficult time learning any information (such as passwords, etc.) from clients before countermeasures are taken to deal with the rogue. The rogue may be able to confuse the client, and perhaps obtain some encrypted data, but the risk is minimal (even less than for some wired networks).

As used herein, access point (AP) refers to receiving points for any known or convenient wireless access technology. Specifically, the term AP is not intended to be limited to 802.11 APs.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and techniques described herein also relate to apparatus for performing the algorithms and techniques. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

It should be noted that not all technologies include the term AP in the literature. For example, SGSN technology does not refer to an access point as an "AP." However, all wireless access technologies require something comparable (i.e., a node at which wireless communications are received and/or transmitted). For example, an independent basic service set (BSS) includes stations that access the service area by directly communicating with one another; thus, the access nodes are the stations themselves. Accordingly, AP is considered to be generally applicable to any technology, regardless of actual verbiage used to describe a BSS with equivalent functionality.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A device comprising:
a plurality of software images embodied in a computer-readable medium;
a management interface through which one of the plurality of software images is designated as a boot image;
a processor that implements the boot image in a boot procedure;
radio hardware through which functionality associated with the boot image is applied to a wireless domain.

2. The device of claim 1, wherein the plurality of software sets include a primary software set and one or more subordinate software sets.

3. The device of claim 1, wherein at least one of the software sets is associated with wireless network connectivity.

4. The device of claim 1, wherein at least one of the software sets is associated with wireless network security.

5. The device of claim 1, further comprising an interface through which new software images may be received.

6. The device of claim 1, wherein the management interface is implemented using XML.

7. A system comprising:
an access point (AP), including a management interface, capable of booting from a plurality of software sets;
a management engine embodied in a computer-readable medium;
wherein, in operation, the management engine selects one of the plurality of software sets with which the AP boots through the management interface of the AP.

8. The system of claim 7, wherein the plurality of software sets include a primary software set and one or more subordinate software sets.

9. The system of claim 7, wherein at least one of the software sets is associated with wireless network connectivity.

10. The system of claim 7, wherein at least one of the software sets is associated with wireless network security.

11. The system of claim 7, wherein, in operation, the management engine receives a selection from an administrator and selects the one of the plurality of software sets in accordance with the selection.

12. The system of claim 7, wherein, in operation, the management engine dynamically selects the one of the plurality of software sets.

13. The system of claim 7, wherein, in operation, the management engine uses time of day to select the one of the plurality of software sets.

14. The system of claim 7, wherein, in operation, the management engine prevents observed devices from obtaining wireless connectivity at particular times of day.

15. The system of claim 7, wherein, in operation, the management engine selects the one of the plurality of software sets to enable more detailed investigation of an event.

16. The system of claim 7, further comprising an independent management system, wherein the management engine is included in the independent management system.

17. A method comprising:
providing a plurality of software images;
selecting a boot image from the plurality of software images;
booting an access point (AP) using the boot image.

18. The method of claim 17, further comprising selecting the boot image according to time of day.

19. The method of claim 17, further comprising selecting the boot image to investigate an event.

20. The method of claim 17, wherein the boot image is a first boot image, further comprising:
setting a risk threshold;
assigning a risk score based upon events in a wireless environment;
selecting a second boot image from the plurality of software images if the risk score exceeds the risk threshold.

* * * * *